(12) United States Patent
Elms et al.

(10) Patent No.: US 7,215,520 B2
(45) Date of Patent: May 8, 2007

(54) CIRCUIT INTERRUPTER INCLUDING ARC FAULT TEST AND/OR GROUND FAULT TEST FAILURE INDICATOR

(75) Inventors: Robert T. Elms, Monroeville, PA (US); Thomas E. Natili, Butler, PA (US)

(73) Assignee: Eaton Corporation, Cleveland, OH (US)

( * ) Notice: Subject to any disclaimer, the term of this patent is extended or adjusted under 35 U.S.C. 154(b) by 183 days.

(21) Appl. No.: 10/894,523

(22) Filed: Jul. 20, 2004

(65) Prior Publication Data

US 2006/0018059 A1    Jan. 26, 2006

(51) Int. Cl.
*H02H 3/00* (2006.01)
(52) U.S. Cl. ....................................... 361/42
(58) Field of Classification Search ............... 361/42
See application file for complete search history.

(56) References Cited

U.S. PATENT DOCUMENTS

| | | | |
|---|---|---|---|
| 4,351,013 A | 9/1982 | Matsko et al. | |
| 4,412,193 A | 10/1983 | Bienwald et al. | |
| 4,568,997 A | 2/1986 | Bienwald et al. | |
| 5,202,662 A | 4/1993 | Bienwald et al. | |
| 5,459,630 A | 10/1995 | MacKenzie et al. | |
| 5,541,800 A | 7/1996 | Misencik | |
| 5,969,920 A | 10/1999 | Mackenzie | |
| 5,982,593 A | 11/1999 | Kimblin et al. | |
| 6,040,967 A | 3/2000 | DiSalvo | |
| 6,052,265 A * | 4/2000 | Zaretsky et al. | 361/42 |
| 6,392,513 B1 * | 5/2002 | Whipple et al. | 335/18 |
| 6,697,238 B2 | 2/2004 | Bonilla et al. | |
| 6,707,651 B2 * | 3/2004 | Elms et al. | 361/42 |
| 6,920,025 B2 * | 7/2005 | Nelson | 361/42 |
| 2004/0056664 A1 | 3/2004 | Macbeth | |
| 2004/0246644 A1* | 12/2004 | Sato et al. | 361/119 |

OTHER PUBLICATIONS

Thermal Aire Technologies, Inc., "Linegard® GFCI Line Cords", 2000, 1 p.

(Continued)

*Primary Examiner*—Stephen W. Jackson
*Assistant Examiner*—Lucy Thomas
(74) *Attorney, Agent, or Firm*—Martin J. Morgan

(57) ABSTRACT

A circuit breaker includes a test circuit having one or two indicators, an arc fault signal generator, and first and second test switches. A first indicator is electrically connected in series with the first test switch. This series combination provides a first alternating current signal to the arc fault signal generator, which provides an arc fault signal to an arc fault trip circuit, in order to trip open separable contacts in response to closure of the first test switch. The series combination of the second test switch and the second indicator provides a second alternating current signal to a ground fault trip circuit, in order to trip in response to closure of the second test switch. The indicators provide a visual indication of failure of the arc fault or ground fault trip circuits to trip in response to closure of the first or second test switches, respectively.

20 Claims, 4 Drawing Sheets

OTHER PUBLICATIONS

Matthew Halverson, "Leaving a Mark", http://www.keepmedia.com/ShowItemDetails.do?itemID=150908&extID=10032&ililD=213, Aug. 1, 2002, 6 pp.

The National Electrical Safety Foundation (NESF), "Electrical Safety TIPS", http://www.shermcoindustriesinc.com/shermcoweb/safety1.htm, 2004, 3 pp.

Hubbell Incorporated, "Circuit Guard®, 15 & 20 Amp Twist-Lock, GFCI Line Cords", http://www.hubbell-wiring.com/library/pressreleases/h4689.pdf, 1999, 4 pp.

Underwriters Laboratories Inc., Request for Comments on Proposed Requirements for the Third Edition of the Standard for Ground-Fault Circuit-Interrupters UL 943; Proposed Effective Date, May 7, 2004, 10 pp.

Fairchild Semiconductor Corporation, "Bipolar T-1 3/4 (5mm) Led Lamp—Diffused", Jul. 26, 2000, pp. 1-4.

* cited by examiner

CIRCUIT INTERRUPTER INCLUDING ARC FAULT TEST AND/OR GROUND FAULT TEST FAILURE INDICATOR

BACKGROUND OF THE INVENTION

1. Field of the Invention

This invention pertains generally to circuit interrupters and, more particularly, to arc fault and/or ground fault circuit interrupters including test circuitry.

2. Background Information

The National Electrical Manufacturers Association (NEMA) is looking for a clear indication of when a ground fault circuit interrupter (GFCI) reaches the end of its life and is not capable of providing ground fault protection. An opportunity exists when a user employs a test button on a GFCI. Since testing is a relatively infrequent event, an uneducated user may not remember what to expect and, if nothing happens (e.g., the GFCI fails to trip in response to the test button being depressed), the user may accept that result, in error, as being acceptable. Loss of ground fault protection may result in equipment damage, serious bodily injury or death in the event of an unprotected ground fault.

It is known to provide a GFCI receptacle with a visual indicator, such as a light-emitting diode (LED), to indicate that the circuit to which the receptacle is connected is operating normally. See, for example, U.S. Pat. Nos. 4,412,193; 4,568,997; and 5,202,662. The lit LED provides a visual indication that the circuit in which the GFCI is installed is operating normally without any ground fault. Upon occurrence of a ground fault, the LED is cut off and the light is extinguished. An extinguished LED provides a visual indication that a fault exists in the circuit. The LED can also be used to test for reverse installation of the GFCI. Should the load terminals be inadvertently connected to the power line and the line leads mistaken for the load leads, the LED will remain lit at all times, even after a test button is actuated, since power will be continuously applied to the terminals across the LED circuit.

U.S. Pat. No. 4,351,013 discloses a circuit interrupter in which a trip unit initiates a tripping operation responsive to a ground fault condition. When tripping occurs, the ground fault condition is indicated by energization of an LED.

U.S. Patent Application Publication No. 2004/0056664 discloses turning a transistor on to activate a fault lamp, thereby indicating a failure of a GFCI circuit.

U.S. Pat. No. 6,697,238 discloses a GFCI including a green LED and a red LED purports to provide a visual indication of the status of the GFCI. When a test switch is pressed and closes primary test switch contacts and an imbalance is created, relays open and cause the green LED to be extinguished. Since the relays are open, subsequent closing of secondary test switch contacts by the test switch has no affect on the GFCI. In contrast, if the closing of primary test switch contacts fail to trip the GFCI, then the secondary test switch contacts cause a short circuit blowing a fuse and extinguishing the green LED. However, a red LED is illuminated to indicate that the GFCI is operating as an unprotected receptacle and not as a GFCI.

There is room for improvement in circuit interrupters including ground fault test circuitry.

There is also room for improvement in circuit interrupters including arc fault test circuitry.

SUMMARY OF THE INVENTION

These needs and others are met by the present invention, which provides a circuit interrupter including an indicator that provides a visual indication of failure of arc fault and/or ground fault test circuitry.

A bi-directional LED may be electrically connected in series with a test member, such as a test button. If the circuit interrupter fails to trip, then the LED stays on as long as the test button is pushed. Otherwise, the LED will simply flash on momentarily as the circuit interrupter trips.

In accordance with one aspect of the invention, an arc fault circuit interrupter comprises: separable contacts; an operating mechanism adapted to open and close the separable contacts; an arc fault trip circuit cooperating with the operating mechanism to trip open the separable contacts in response to an arc fault condition; and a test circuit including an indicator, a test member and an arc fault signal generator, the indicator being electrically connected in series with the test member, the series combination of the test member and the indicator being adapted to provide an alternating current signal to the arc fault signal generator, the arc fault signal generator being adapted to provide an arc fault signal to the arc fault trip circuit, in order to trip open the separable contacts in response to actuation of the test member, the indicator being adapted to provide a visual indication of failure of the arc fault trip circuit to trip open the separable contacts in response to actuation of the test member.

The indicator may be a bi-directional light emitting diode. The indicator may be operatively associated with an indicia of failure of the arc fault circuit interrupter. The test member may be a test button.

The indicator may provide the visual indication of failure of the arc fault trip circuit to trip open the separable contacts during the actuation of the test member.

As another aspect of the invention, a ground fault circuit interrupter comprises: separable contacts; an operating mechanism adapted to open and close the separable contacts; a ground fault trip circuit cooperating with the operating mechanism to trip open the separable contacts in response to a ground fault condition; and a test circuit including an indicator and a test member, the indicator being electrically connected in series with the test member, the series combination of the test member and the indicator being adapted to provide an alternating current signal to the ground fault trip circuit, in order to trip open the separable contacts in response to actuation of the test member, the indicator being adapted to provide a visual indication of failure of the ground fault trip circuit to trip open the separable contacts in response to actuation of the test member.

The indicator may be a bi-directional light emitting diode. The indicator may be operatively associated with an indicia of failure of the ground fault circuit interrupter. The test member may be a test button.

The indicator may provide the visual indication of failure of the ground fault trip circuit to trip open the separable contacts during the actuation of the test member.

As another aspect of the invention, an arc fault/ground fault circuit interrupter comprises: separable contacts; an operating mechanism adapted to open and close the separable contacts; an arc fault trip circuit cooperating with the operating mechanism to trip open the separable contacts in response to an arc fault condition; a ground fault trip circuit cooperating with the operating mechanism to trip open the separable contacts in response to a ground fault condition; and a test circuit including at least one indicator, an arc fault signal generator, a first test switch and a second test switch, the at least one indicator being electrically connected in series with the first test switch, the series combination of the first test switch and the at least one indicator being adapted to provide a first alternating current signal to the arc fault signal generator, the arc fault signal generator being adapted to provide an arc fault signal to the arc fault trip circuit, in order to trip open the separable contacts in response to closure of the first test switch, the series combination of the second test switch and the at least one indicator also being adapted to provide a second alternating current signal to the ground fault trip circuit, in order to trip open the separable contacts in response to closure of the second test switch, the at least one indicator being adapted to provide a visual indication of failure of the arc fault trip circuit or the ground fault trip circuit to trip open the separable contacts in response to closure of the first test switch or the second test switch, respectively.

The at least one indicator may be a single bi-directional light emitting diode.

The at least one indicator may include a first bi-directional indicator associated with the arc fault trip circuit and a second bi-directional indicator associated with the ground fault trip circuit. The first bi-directional indicator may be electrically connected in series with the first test switch. The second bi-directional indicator may be electrically connected in series with the second test switch.

The at least one indicator may include a first bi-directional light emitting diode associated with the arc fault trip circuit and a second bi-directional light emitting diode associated with the ground fault trip circuit.

The at least one indicator may be operatively associated with at least one indicia of failure of the arc fault/ground fault circuit interrupter.

The first and second test switches may form a three position test button including a first actuated position to actuate the arc fault trip circuit, a second actuated position to actuate the ground fault trip circuit and a third non-actuated position, the first actuated position corresponding to the closure of the first test switch and the second actuated position corresponding to the closure of the second test switch.

The at least one indicator may include a first bi-directional indicator associated with the arc fault trip circuit and a second bi-directional indicator associated with the ground fault trip circuit. The first bi-directional indicator may provide the visual indication of failure of the arc fault trip circuit to trip open the separable contacts during the actuation of the three position test button in the first actuated position thereof. The second bi-directional indicator may provide the visual indication of failure of the ground fault trip circuit to trip open the separable contacts during the actuation of the three position test button in the second actuated position thereof.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "bi-directional light emitting diode" or "bi-directional LED" shall expressly include, but not be limited by, a light emitting diode adapted to input and output an alternating current electrical signal (e.g., from one circuit to another circuit) and to responsively output a light signal.

EXAMPLE 1

As a non-limiting example, a "bi-directional LED" includes the parallel combination of two LEDs in which the anode and cathode of one of the LEDs are electrically connected to the cathode and anode, respectively, of the other LED. An example of a bi-directional (e.g., bipolar) LED is a model MV5094A marketed by Fairchild Semiconductor Corporation of South Portland, Me.

EXAMPLE 2

As another non-limiting example, a "bi-directional LED" includes the antiparallel combination of two LED circuits each having an LED and one or more of a series resistor and/or a series diode.

EXAMPLE 3

The LEDs of Example 1 may be housed within the same housing or may be housed within separate housings and be disposed behind a common lens or window.

EXAMPLE 4

The LED circuits of Example 2 may be housed within the same housing or may be housed within separate housings and be disposed behind a common lens or window.

The present invention is described in association with a circuit breaker, although the invention is applicable to a wide range of circuit interrupters for arc fault and/or ground fault applications.

Figure 1:
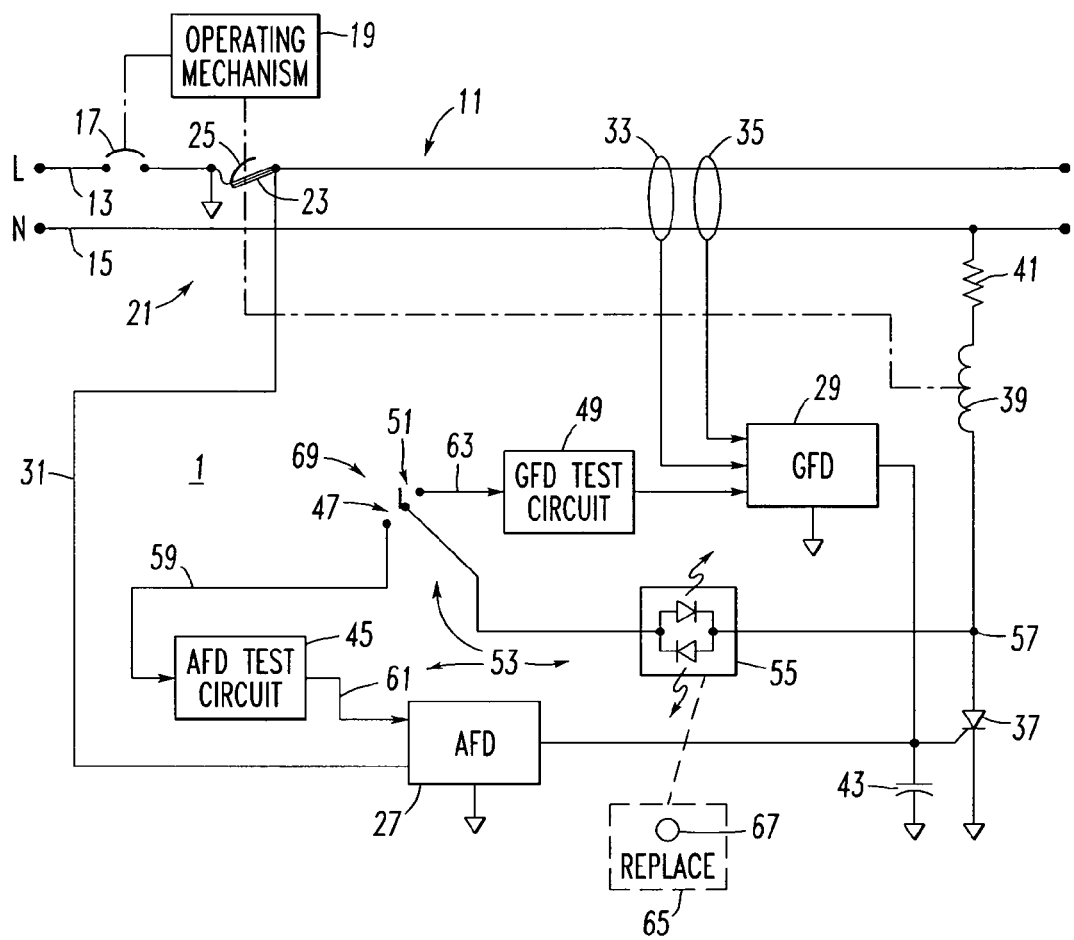
FIG. 1 is a block diagram of an arc fault/ground fault circuit interrupter in accordance with the present invention.

Referring to FIG. 1, an arc fault/ground fault circuit breaker 1 is connected in an electric power system 11 which has a line conductor (L) 13 and a neutral conductor (N) 15. The circuit breaker 1 includes separable contacts 17 which are electrically connected in the line conductor 13. The separable contacts 17 are opened and closed by an operating mechanism 19. In addition to being operated manually by a handle (not shown), the operating mechanism 19 can also be actuated to open the separable contacts 17 by a trip assembly 21. This trip assembly 21 includes the conventional bimetal 23 which is heated by persistent overcurrents and bends to actuate the operating mechanism 19 to open the separable contacts 17. An armature 25 in the trip assembly 21 is attracted by the large magnetic force generated by very high overcurrents to also actuate the operating mechanism 19 and provide an instantaneous trip function.

The circuit breaker 1 is also provided with an arc fault detector (AFD) 27 and a ground fault detector (GFD) 29. The arc fault detector 27 may be, for instance, of the type which detects the step increases in current which occur each time an arc is struck, although a wide range of other types of arc fault detectors could also be used. The arc fault detector 27 senses the current in the electrical system 11 by monitoring the voltage across the bimetal 23 through the lead 31 in the manner described, for example, in U.S. Pat. No. 5,519,561. The ground fault detector 29 may be of the well known dormant oscillator type in which case it utilizes a pair of sensing coils 33 and 35 to detect both line to ground and neutral to ground faults, although a wide range of other types of ground fault detectors (e.g., personnel protection; equipment protection) may be employed.

If the arc fault detector 27 detects an arcing fault in the electric power system 11, then a trip signal is generated which turns on a switch such as the silicon controlled rectifier (SCR) 37 to energize a trip solenoid 39. Detection of a ground fault by the ground fault detector 29 generates a trip signal which also turns on the SCR 37 and energizes the trip solenoid 39. The trip solenoid 39 when energized actuates the operating mechanism 19 to open the separable contacts 17. A resistor 41 in series with the coil of the solenoid 39 limits the coil current and a capacitor 43 protects the gate of the SCR 37 from voltage spikes and false tripping due to noise. Alternatively, the resistor 41 need not be employed.

The arc fault detector 27 and the ground fault detector 29 cooperate with the operating mechanism 19 to trip open the separable contacts 17 in response to an arc fault condition and a ground fault condition, respectively. Both of these detectors 27,29 have test circuits. The arc fault detector test circuit 45 provides signals to the arc fault detector 27 which mimic arc faults in the electrical system 11. The arc fault detector test circuit 45 is actuated by an arc fault test switch 47. The ground fault detector test circuit 49, when actuated by a ground fault test switch 51, generates a test signal which is applied to the ground fault detector 29. If the arc fault detector 27 and the ground fault detector 29 are operating properly, then they should generate trip signals which open the separable contacts 17 when the corresponding one of the test circuits 45 and 49, respectively, is actuated.

In accordance with the invention, a test circuit 53 includes one or more indicators, such as 55 (only one indicator 55 is shown in FIG. 1), an arc fault signal generator, such as the arc fault test circuit 45, the first arc fault test switch 47 and the second ground fault test switch 51. The indicator 55 is electrically connected in series with the first arc fault test switch 47 between the arc fault test circuit 45 and a node 57. The series combination of the first arc fault test switch 47 and the indicator 55 is adapted to provide a first alternating current signal 59 to the arc fault test circuit 45, which is adapted to provide an arc fault signal 61 to an arc fault trip circuit, such as the arc fault detector 27, in order to trip open the separable contacts 17 in response to closure of the test switch 47.

The indicator 55 is also electrically connected in series with the second ground fault test switch 51 between the ground fault test circuit 49 and the node 57. The series combination of the second ground fault test switch 51 and the indicator 55 is adapted to provide a second alternating current signal 63 to a ground fault trip circuit, such as the ground fault detector 29, in order to trip open the separable contacts 17 in response to closure of the second ground fault test switch 51.

The indicator 55 (e.g., a bidirectional LED; a lamp) is adapted to provide a visual indication of failure of the arc fault detector 27 or the ground fault detector 29 to trip open the separable contacts 17 in response to closure of the test switches 47 or 51, respectively.

EXAMPLE 5

The indicator 55 is preferably operatively associated with an indicia 65 of failure of the arc fault/ground fault circuit breaker 1.

EXAMPLE 6

The indicia 65 may be a label (e.g., REPLACE) with an opening 67 therein for the indicator 55 to pass therethrough.

EXAMPLE 7

The first and second test switches 47,51 may form a three position test button 69 including a first actuated position (i.e., switch 47 closed and switch 51 open) to actuate the arc fault detector 27, a second actuated position (i.e., switch 47 open and switch 51 closed) to actuate the ground fault detector 29 and a third non-actuated position (i.e., switches 47 and 51 open).

An example of the circuit breaker 1, excluding the indicator 55 and the indicia 65, is disclosed in U.S. Pat. No. 6,392,513, which is incorporated by reference herein.

Figure 2A:
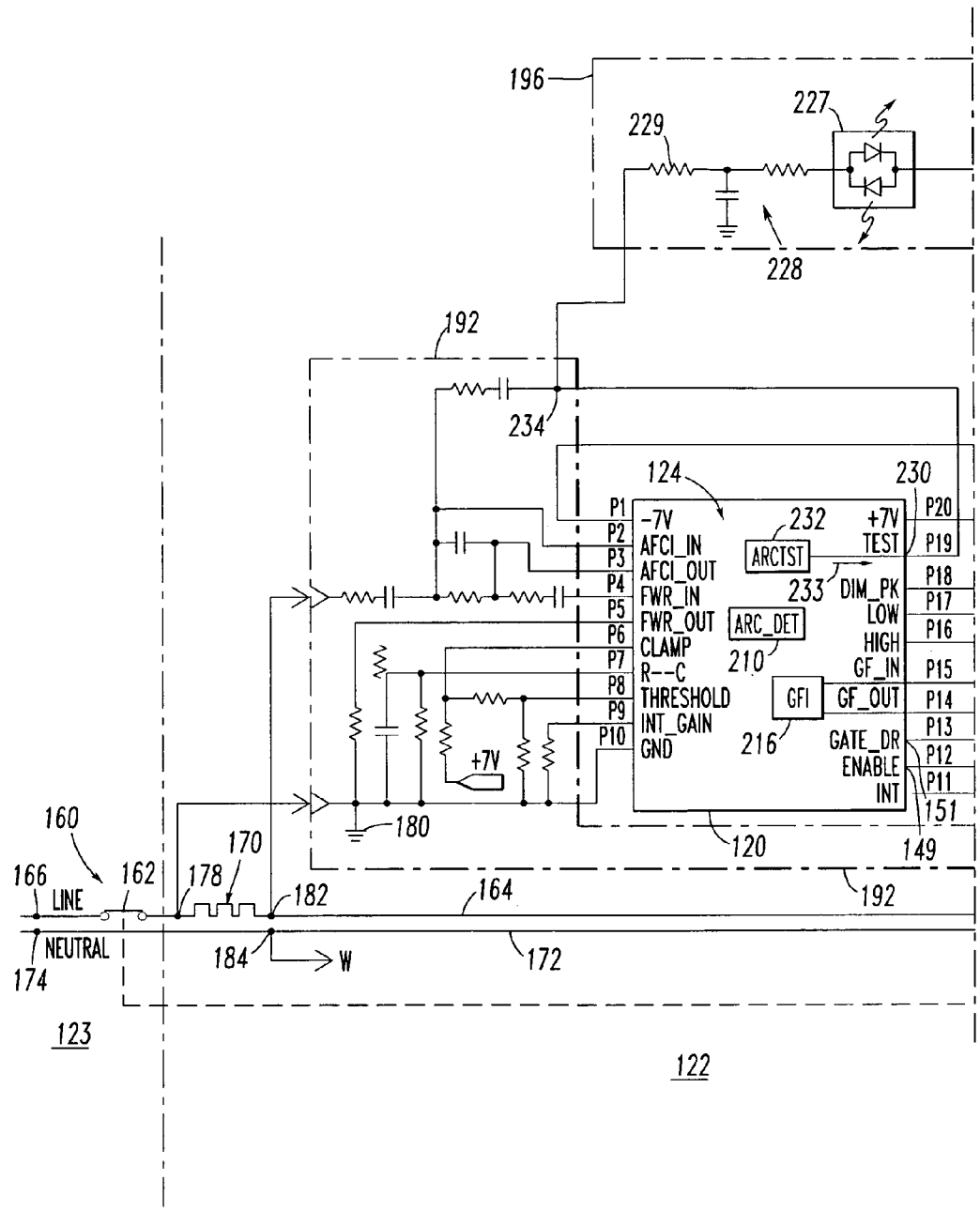
FIGS. 2A–2B form a block diagram in schematic form of an arc fault/ground fault circuit interrupter in accordance with an embodiment of the invention.
Figure 2B:
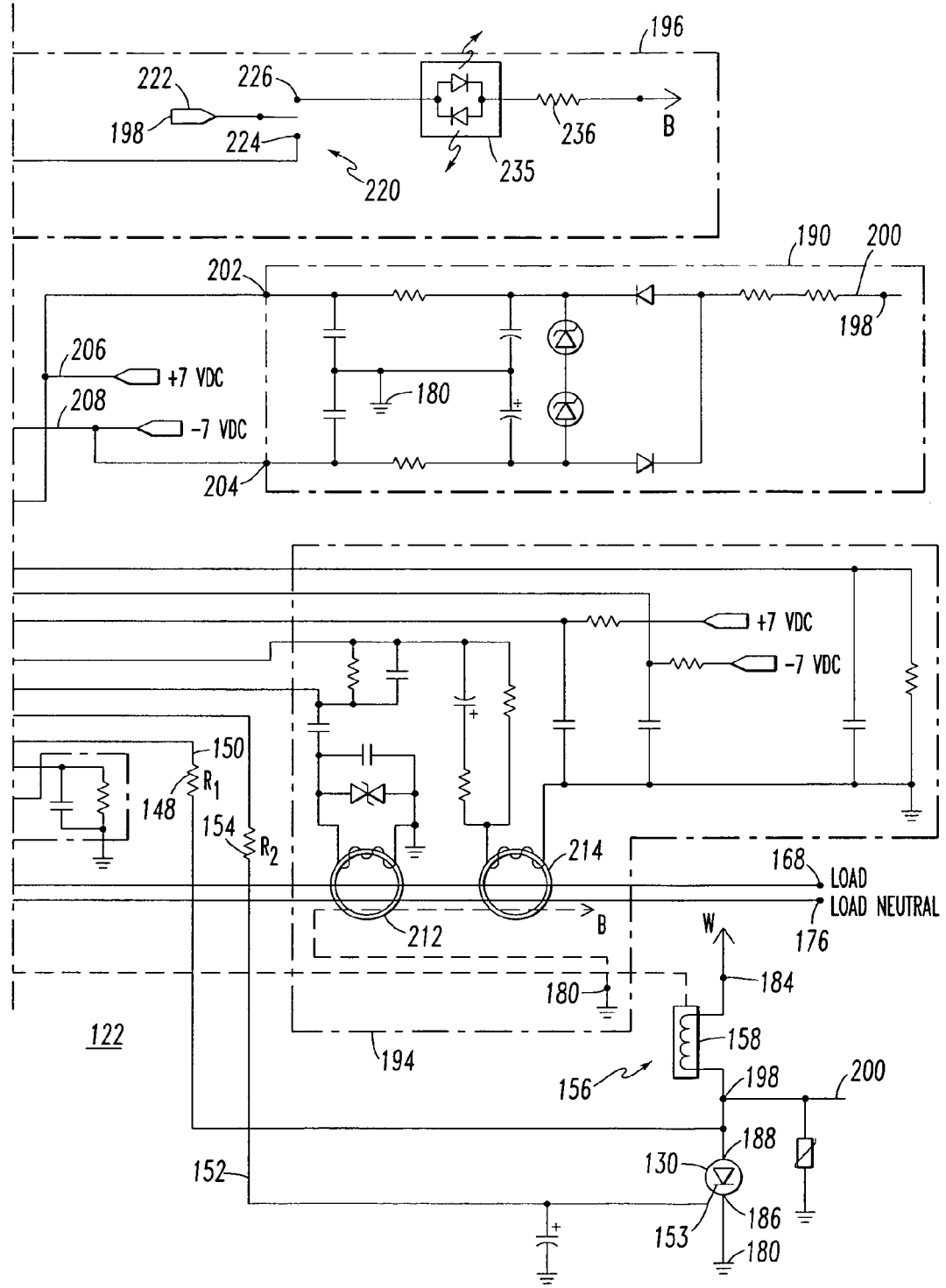

Referring to FIGS. 2A–2B, a trip unit 122 includes a trip logic circuit 124 that is incorporated in a bipolar arc fault/ground fault ASIC circuit 120. The ASIC 120 provides suitable gate current in response to one of two trip requests (e.g., arc fault trip and ground fault trip) when a triac 130 is in the OFF state with a suitable supporting voltage and when the ASIC 120 is suitably powered. The trip unit 122 is for operation with a circuit interrupter 123, such as an arc fault and/or ground fault circuit breaker.

As shown in FIG. 2B, a resistor 148, $R_1$, converts the voltage across the trip device (e.g., the triac 130) into a current signal 150. The trip signal generator "ENABLE" input 149 is electrically interconnected with the anode 188 of the triac 130 by the resistor 148. The trip signal generator "GATE_DR" output 151 produces the trip output signal 152 for the gate 153 of the triac 130 through a resistor 154, $R_2$ (e.g., without limitation, about 100 Ω). This sources a suitable gate drive current level (e.g., at least about 5 mA for the triac 130) to the triac gate 153 through the resistor 154.

As is conventional, the trip unit 122 includes a suitable trip actuator, such as trip solenoid 156, having a trip coil 158 for tripping open the operating mechanism 160 and separable contacts 162 of the circuit interrupter 123. The trip unit 122 and circuit interrupter 123 include a first conductive path 164 disposed between a line terminal 166 and a load terminal 168. The separable contacts 162 of the circuit interrupter 123 are electrically connected in series with a suitable shunt 170 (e.g., a bimetal; a conductor having a suitable resistance) between the terminals 166,168. The trip unit 122 and circuit interrupter 123 also include a second conductive path 172 disposed between a neutral terminal 174 and a load neutral terminal 176. A first node 178 of the shunt 170 defines a local ground 180 for the ASIC 120. A second node 182 of the shunt 170 is employed to sense the arc fault current in the first conductive path 164. The second conductive path 172 defines a node 184 (W), which is employed to power the trip solenoid trip coil 158. The triac 130 drives the trip coil 158. The cathode 186 of the triac 130 is electrically connected to the local ground 180 and the triac anode 188 is electrically connected to the resistor 148 and the trip coil 158. The series combination of the trip coil 158 and the triac 130 is electrically connected between the node 184 and the local ground 180.

The trip unit 122 further includes a power supply 190, a first interface circuit 192, a second interface circuit 194, and a test selection circuit 196. The power supply 190 includes an input 198 with an AC voltage 200 with respect to the local ground 180 and further includes two outputs 202 and 204 with respective +7 VDC 206 and −7 VDC 208 voltages. The first interface circuit 192 interfaces the voltage between the shunt nodes 178,182 and an arc fault detection circuit (ARC_DET) 210. The second interface circuit 194 includes two current transformers 212,214 and interfaces to a ground fault detection circuit (GFI) 216 and a dimmer detection circuit (not shown) of the ASIC 120. The dimmer detection circuit is preferably employed to disable the arc fault detection circuit 210 upon detection of a transient associated with cold turn-on of an incandescent bulb powered by a dimmer (not shown).

The test selection circuit 196 includes a three-position (i.e., inactive, arc fault test, ground fault test) test button 220 having a common terminal 222 and two output terminals 224,226. The common terminal 222 is electrically connected to the power supply input 198 to receive the AC voltage 200. Normally, the common terminal 222 is electrically disconnected from the two output terminals 224,226. However, the test button 220 may be actuated from a central inactive position to a first actuated position (not shown), in order to electrically connect the common terminal 222 and the first output terminal 224. In this position, the AC voltage 200 is applied through indicator 227, RC filter 228 and resistor 229 to an input (TEST) 230 of an arc fault test signal generator circuit (ARCTST) 232. In response to the filtered AC voltage, the circuit 232 generates a suitable arc fault test signal 233 for input by input 234 of the first interface circuit 192.

The test button 220 may also be actuated from the inactive central position to a second actuated position (not shown), in order to electrically connect the common terminal 222 and the second output terminal 226. In this position, the AC voltage 200 is applied through indicator 235 and resistor 236 to produce a suitable ground fault test current, which flows between the node 184 and the local ground 180 through the series combination of the trip coil 158, second output terminal 226, indicator 235 and resistor 236 and through the openings of the current transformers 212,214, in order to simulate ground fault current on one of the conductive paths 164,172.

The indicators 227,235, as shown, are preferably bi-directional LEDs (e.g., red).

An example of the trip unit 122 and circuit interrupter 123, excluding the indicators 227,235, is disclosed in U.S. Pat. No. 6,707,651, which is incorporated by reference herein.

Figure 3:
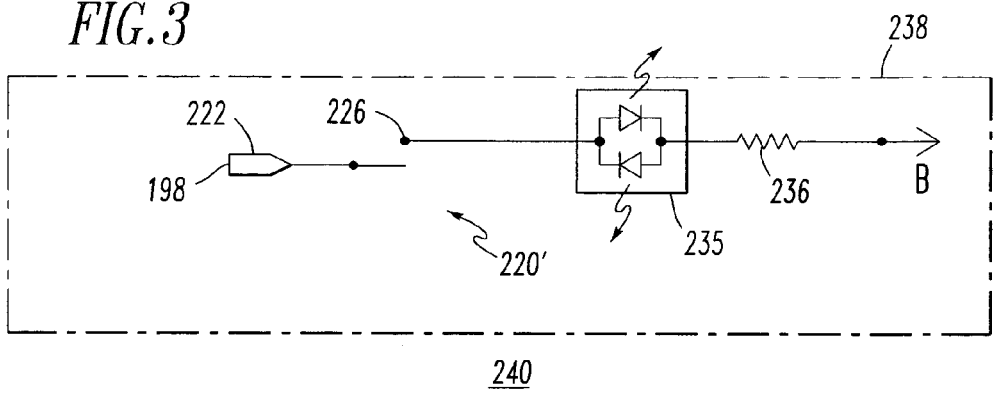
FIG. 3 is a block diagram in schematic form of ground fault test and indication circuitry in accordance with another embodiment of the invention.

FIG. 3 shows ground fault test and indication circuitry 238 of a ground fault circuit interrupter 240. The circuitry 238 is similar to the test selection circuit 196 of FIG. 2B except that the indicator 227 need not be employed. The circuit interrupter 240 is similar to the circuit interrupter 123 of FIG. 2A, except that arc fault detector and test circuits need not be employed. In this example, the indicator 235 is a bi-directional light emitting diode (e.g., red). Although not shown, the indicator 235 may be operatively associated with an indicia (e.g., 65 of FIG. 1) of failure of the ground fault circuit interrupter 240. A suitable test member, such as test button 220', is electrically connected in series with the indicator 235. The series combination of the test button 220' and the indicator 235 are adapted to provide an alternating current signal through the resistor 236, in order to trip the ground fault circuit interrupter 240. The indicator 235 is adapted to provide a visual indication of failure to trip in response to actuation of the test button 220'.

Figure 4:
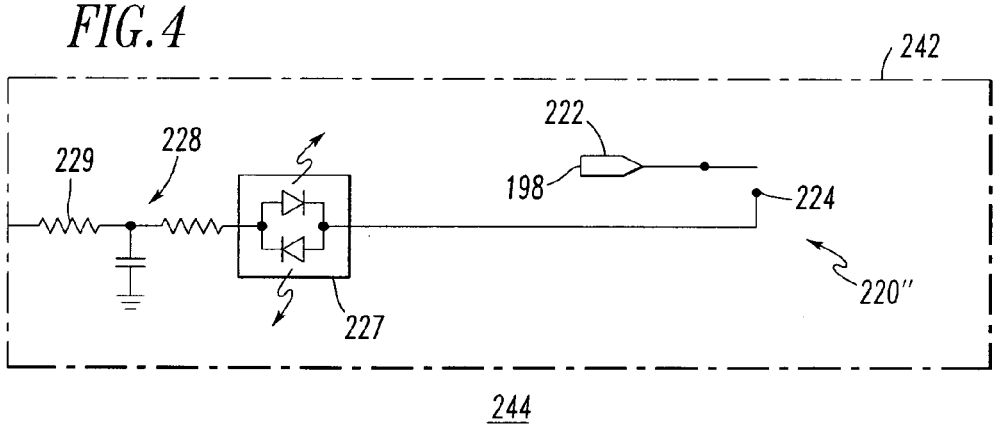
FIG. 4 is a block diagram in schematic form of arc fault circuit interrupter test and indication circuitry in accordance with another embodiment of the invention.

FIG. 4 shows arc fault test and indication circuitry 242 of an arc fault circuit interrupter 244. The circuitry 242 is similar to the test selection circuit 196 of FIG. 2B except that the indicator 235 need not be employed. The circuit interrupter 244 is similar to the circuit interrupter 123 of FIG. 2A, except that ground fault detector and test circuits need not be employed. In this example, the indicator 227 is a bi-directional light emitting diode (e.g., red). Although not shown, the indicator 227 may be operatively associated with an indicia (e.g., 65 of FIG. 1) of failure of the arc fault circuit interrupter 240. A suitable test member, such as test button 220", is electrically connected in series with the indicator 227. The series combination of the test button 220" and the indicator 227 is adapted to provide an alternating current signal to an arc fault signal generator (not shown), which is adapted to provide an arc fault signal to an arc fault trip circuit (not shown), in order to trip the arc fault circuit interrupter 244. The indicator 227 is adapted to provide a visual indication of failure to trip in response to actuation of the test button 220".

Preferably, the indicator 227 includes relatively high efficiency LEDs as compared to the LEDs of the indicator 235 of FIG. 3, since the series combination of the RC filter 228 and the resistor 229 has a relatively greater resistance as compared to the resistor 236 of FIG. 3.

Figure 5:
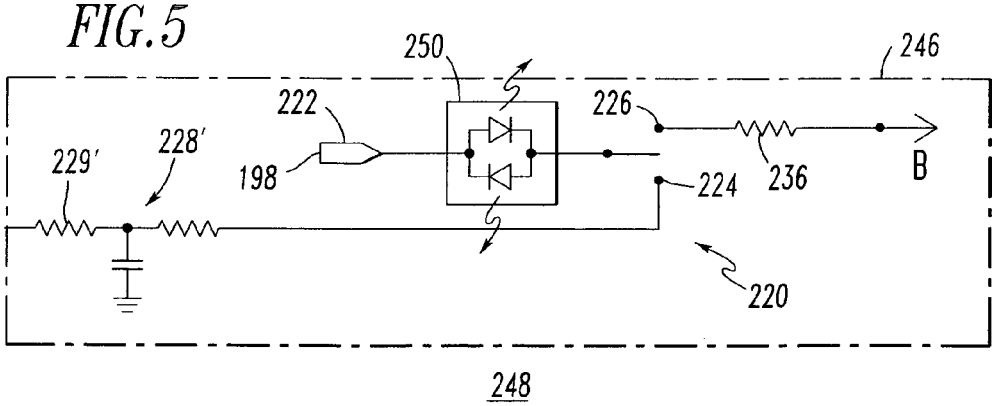
FIG. 5 is a block diagram in schematic form of arc fault/ground fault interrupter test and indication circuitry in accordance with another embodiment of the invention.

FIG. 5 shows arc fault/ground fault circuit interrupter test and indication circuitry 246 of an arc fault/ground fault circuit interrupter 248. The circuitry 246 is similar to the test selection circuit 196 of FIG. 2B except that a single indicator 250 is employed in place of the indicators 227,235 and except that an RC filter 228' and resistor 229' are employed in place of the RC filter 228 and resistor 229. The circuit interrupter 248 is similar to the circuit interrupter 123 of FIG. 2A. The resistance of the RC filter 228' and resistor 229' is preferably lower than the resistance of the RC filter 228 and resistor 229, in order that the intensity of the indicator 250 is about the same for both arc fault and ground fault failure conditions.

In this example, the indicator 250 is a bi-directional light emitting diode (e.g., red). Although not shown, the indicator 250 may be operatively associated with an indicia (e.g., 65 of FIG. 1) of failure of the circuit interrupter 248. The indicator 250 is adapted to provide a visual indication of failure to trip in response to actuation of the test button 220 for either of the arc fault or ground fault test modes.

Although a bipolar arc fault/ground fault ASIC circuit 120 is disclosed, it will be appreciated that a combination of one or more of analog, digital and/or processor-based circuits may be employed.

Although a three position test button 220 is disclosed for the AFCI/GFCI circuit interrupter 123, the invention is applicable to a wide range of test members and switches for initiating arc fault and/or ground fault tests.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An arc fault circuit interrupter comprising:
separable contacts;
an operating mechanism adapted to open and close said separable contacts;
an arc fault trip circuit cooperating with said operating mechanism to trip open said separable contacts in response to an arc fault condition; and
a test circuit including an indicator, a test member and an arc fault signal generator, said indicator being electrically connected in series with said test member, said test member and said indicator both being adapted to provide an alternating current signal to said arc fault signal generator, said arc fault signal generator being adapted to provide an arc fault signal to said arc fault trip circuit, in order to trip open said separable contacts in response to actuation of said test member, said indicator being adapted to provide a visual indication of failure of said arc fault trip circuit to trip open said separable contacts in response to actuation of said test member.

2. The arc fault circuit interrupter of claim 1 wherein said indicator is a bi-directional light emitting diode.

3. The arc fault circuit interrupter of claim 2 wherein said bi-directional light emitting diode is a red bi-directional light emitting diode.

4. The arc fault circuit interrupter of claim 1 wherein said indicator is operatively associated with an indicia of failure of said arc fault circuit interrupter.

5. The arc fault circuit interrupter of claim 1 wherein said test member is a test button.

6. The arc fault circuit interrupter of claim 1 wherein said indicator provides said visual indication of failure of said arc fault trip circuit to trip open said separable contacts during said actuation of said test member.

7. A ground fault circuit interrupter comprising:
separable contacts;
an operating mechanism adapted to open and close said separable contacts;
a ground fault trip circuit cooperating with said operating mechanism to trip open said separable contacts in response to a ground fault condition; and
a test circuit including an indicator and a test member, said indicator being electrically connected in series with said test member, said test member and said indicator both being adapted to provide an alternating current signal to said ground fault trip circuit, in order to trip open said separable contacts in response to actuation of said test member, said indicator being adapted to provide a visual indication of failure of said ground fault trip circuit to trip open said separable contacts in response to actuation of said test member.

8. The ground fault circuit interrupter of claim 7 wherein said indicator is a bi-directional light emitting diode.

9. The ground fault circuit interrupter of claim 8 wherein said bi-directional light emitting diode is a red bi-directional light emitting diode.

10. The ground fault circuit interrupter of claim 7 wherein said indicator is operatively associated with an indicia of failure of said ground fault circuit interrupter.

11. The ground fault circuit interrupter of claim 7 wherein said test member is a test button.

12. The ground fault circuit interrupter of claim 7 wherein said indicator provides said visual indication of failure of said ground fault trip circuit to trip open said separable contacts during said actuation of said test member.

13. An arc fault/ground fault circuit interrupter comprising:
separable contacts;
an operating mechanism adapted to open and close said separable contacts;
an arc fault trip circuit cooperating with said operating mechanism to trip open said separable contacts in response to an arc fault condition;
a ground fault trip circuit cooperating with said operating mechanism to trip open said separable contacts in response to a ground fault condition; and
a test circuit including at least one indicator, an arc fault signal generator, a first test switch and a second test switch, said at least one indicator being electrically connected in series with said first test switch, said first test switch and said at least one indicator both being adapted to provide a first alternating current signal to said arc fault signal generator, said arc fault signal generator being adapted to provide an arc fault signal to said arc fault trip circuit, in order to trip open said separable contacts in response to closure of said first test switch, said second test switch and said at least one indicator also both being adapted to provide a second alternating current signal to said ground fault trip circuit, in order to trip open said separable contacts in response to closure of said second test switch, said at least one indicator being adapted to provide a visual indication of failure of said arc fault trip circuit or said ground fault trip circuit to trip open said separable contacts in response to closure of said first test switch or said second test switch, respectively.

14. The arc fault/ground fault circuit interrupter of claim 13 wherein said at least one indicator is a single bi-directional light emitting diode.

15. The arc fault/ground fault circuit interrupter of claim 13 wherein said at least one indicator includes a first bi-directional indicator associated with said arc fault trip circuit and a second bi-directional indicator associated with said ground fault trip circuit, said first bi-directional indicator being electrically connected in series with said first test switch, said second bi-directional indicator being electrically connected in series with said second test switch.

16. The arc fault/ground fault circuit interrupter of claim 13 wherein said at least one indicator includes a first bi-directional light emitting diode associated with said arc fault trip circuit and a second bi-directional light emitting diode associated with said ground fault trip circuit.

17. The arc fault/ground fault circuit interrupter of claim 13 wherein said at least one indicator includes a single red bi-directional light emitting diode.

18. The arc fault/ground fault circuit interrupter of claim 13 wherein said at least one indicator is operatively associated with at least one indicia of failure of said arc fault/ground fault circuit interrupter.

19. The arc fault/ground fault circuit interrupter of claim 13 wherein said first and second test switches form a three position test button including a first actuated position to actuate said arc fault trip circuit, a second actuated position to actuate said ground fault trip circuit and a third non-actuated position, said first actuated position corresponding to said closure of said first test switch and said second actuated position corresponding to said closure of said second test switch.

20. The arc fault/ground fault circuit interrupter of claim 19 wherein said at least one indicator includes a first bi-directional indicator associated with said arc fault trip circuit and a second bi-directional indicator associated with said ground fault trip circuit; wherein said first bi-directional indicator provides said visual indication of failure of said arc fault trip circuit to trip open said separable contacts during said actuation of said three position test button in the first actuated position thereof and wherein said second bi-directional indicator provides said visual indication of failure of said ground fault trip circuit to trip open said separable contacts during said actuation of said three position test button in the second actuated position thereof.

* * * * *